United States Patent
Wright et al.

(10) Patent No.: US 11,249,873 B2
(45) Date of Patent: Feb. 15, 2022

(54) METHOD AND APPARATUS FOR CONTINUOUS INTEGRATION TESTING OF NETWORK ACCESS DEVICES

(71) Applicant: Charter Communications Operating, LLC, St. Louis, MO (US)

(72) Inventors: Ethan Wright, Denver, CO (US); Micah Labbee, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/839,130

(22) Filed: Apr. 3, 2020

(65) Prior Publication Data
US 2021/0314247 A1 Oct. 7, 2021

(51) Int. Cl.
| | |
|---|---|
| G06F 11/22 | (2006.01) |
| H04L 12/26 | (2006.01) |
| H04L 29/06 | (2006.01) |
| H04W 8/04 | (2009.01) |
| H04W 12/30 | (2021.01) |
| H04L 29/08 | (2006.01) |
| H04L 9/08 | (2006.01) |

(52) U.S. Cl.
CPC .......... G06F 11/2247 (2013.01); H04L 43/14 (2013.01); H04L 43/50 (2013.01); H04L 63/061 (2013.01); H04W 8/04 (2013.01); H04L 9/0866 (2013.01); H04L 43/0811 (2013.01); H04L 67/303 (2013.01); H04W 12/35 (2021.01)

(58) Field of Classification Search
CPC ... H04L 63/061; H04L 67/303; H04L 9/0866; H04L 9/14; H04L 67/34; G06F 11/2247; H04W 12/04; H04W 12/08; H04W 12/35; H04W 12/088; H04W 12/086; H04W 4/50

See application file for complete search history.

(56) References Cited

U.S. PATENT DOCUMENTS

| | | | |
|---|---|---|---|
| 7,555,421 B1 | 6/2009 | Beckett et al. | |
| 8,325,614 B2 * | 12/2012 | Poon | H04W 8/04 370/241 |
| 9,602,279 B1 * | 3/2017 | Tran | H04L 63/061 |
| 9,785,527 B2 | 10/2017 | Regev et al. | |
| 2011/0078510 A1 * | 3/2011 | Beveridge | G06F 11/2247 714/38.1 |

* cited by examiner

*Primary Examiner* — Kyung H Shin
(74) *Attorney, Agent, or Firm* — Young Basile Hanlon & MacFarlane, P.C.

(57) ABSTRACT

Disclosed herein are methods and apparatus for continuous integration testing of network access devices. A testing platform includes a virtual environmental library and a processor. The processor executes a test code, where the test code in cooperation with the virtual environmental library generates a virtual environment for testing a network access device loaded with a device code, the virtual environment includes virtual clients, a virtual service provider, and emulates communication interfaces and network message behavior for the virtual clients and the virtual service provider as perceived by the network access device, exercises the device code and the network access device by instructing the virtual clients and the virtual service provider to engage the network access device to perform defined activities, captures events in response to performance of the defined activities, evaluates the captured events against expected events, and outputs results including the captured events and pass/fail determinations.

20 Claims, 5 Drawing Sheets

METHOD AND APPARATUS FOR CONTINUOUS INTEGRATION TESTING OF NETWORK ACCESS DEVICES

TECHNICAL FIELD

This disclosure relates to network access devices. More specifically, this disclosure relates to testing of applications on the network access devices.

BACKGROUND

Continuous integration, continuous deployment, and continuous delivery (collectively "continuous integration") employ a variety of automated techniques and processes for testing applications or code changes that are to be deployed onto a network access device. These techniques generally involve insuring code executability, compilation testing, and the like. The network access device has to be tested once the applications or code is loaded onto the network access device. For example, network access device testing requires multiple layers of testing including transmitting WiFi signals at the radios in the network access device to test the radios, running generic tests to verify proper routing, and testing certain configuration settings.

There is a lack of automated testing once the application or code is loaded onto the network access device. Manual testing of the network access devices with the newly loaded application or code is cumbersome and time consuming. Applications are getting smarter that run on the network access device, and the development and testing cycle is jarring and manual. If an application is written to limit the network access device to only 4 connected clients, to validate the application a developer must manually connect 5 clients and view the logs of their application to see the output. Configuring the network access devices for testing each new software or firmware delivery is inefficient. Moreover, all of these tests are run against a monolithic firmware build that could fail at any layer.

SUMMARY

Disclosed herein are methods and apparatus for continuous integration testing of network access devices. In an implementation, a testing platform includes a virtual environmental library and a processor. The processor configured to execute a test code, where the test code in cooperation with the virtual environmental library is configured to generate a virtual environment for testing a network access device loaded with a device code, wherein the virtual environment includes virtual clients, a virtual service provider, and emulates communication interfaces and network message behavior for the virtual clients and the virtual service provider as perceived by the network access device, exercise the device code and the network access device by instructing the virtual clients and the virtual service provider to engage the network access device to perform defined activities to test the device code, capture events from the network access device in response to performance of the defined activities, evaluate the captured events against expected events defined in the test code, and output results from the testing of the device code and the network access device including at least the captured events and a pass and fail determination.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, network access, wired communications, wireless communications, telephony, web browsers, e-commerce transactions, media players, streaming, Internet Protocol (IP) video, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and apparatus for apparatus for continuous integration testing of network access devices. A framework or platform is provided for continuously deploying and running automated tests or test code against or on a network access device after loading of an application, code, software, or firmware (collectively "device code") on the network access device by a developer or the like. The framework includes libraries which can referenced during the execution or running of a test code to generate a virtual environment for testing the network access device. Generation of the virtual environment can include generating virtual clients to connect to the network access device, emulating system or device connections on a wide area network (WAN), and sending environmental scene or test traffic over any of the communication interfaces of the network access device including a local area network (LAN) interface, the WAN interface, or an Ethernet interface. The test code is committed when the device code is committed. An executable based on the test code is generated for and run against each network access device type to test network access device functionality. Consequently, the framework allows testing of the network access device and the device code on a dynamic, continuous, and multiple level or multiple systems basis.

In implementations, a virtual environmental library generates a virtual environment in accordance with the test code in which a network access device operates in. The virtual environment can include a virtual service provider, virtual client(s), and associated virtual LAN, WAN, and Ethernet communications. Traffic or message(s) (collectively "message(s)") including command and control messages, configuration messages, reporting messages, and the like to the network access device from the virtual service provider and the virtual client(s) are emulated by the virtual environmental library as scripted by the test code. The virtual environmental library can further emulate response message(s) from the virtual service provider and the virtual client(s) based on the behavior of the network access device. For example, the messages can be transmitted or implemented via Technical Report 069 (TR-069), TR-181, Open vSwitch Database Management Protocol (OVSDB), MQ Telemetry Transport (MQTT), Simple (or Streaming) Text Orientated Messaging Protocol (STOMP), Representational state transfer (REST) RESTful, and the like communication protocols or architectures.

In implementations, the test code sets the configuration of the virtual environment, sets the configuration of the network access device, and sets the behavior of the virtual client(s) and the virtual service provider in the virtual environment in a prescriptive manner. The test code in coordination with the virtual environment library emulates network behavior to test the functionality of the device code, the functionality of the network access device, and the functionality of the device code with the network access device. The test code can be committed to a test server or platform when the device code is committed to the network access device. In implementations, the test code is automatically loaded onto the test server or platform. This enables efficient and effective network access device testing.

In implementations, the network access device can be a physical or virtual network device which interacts or functions within the virtual environment. The network access device is unaware that it is being tested or in the virtual environment. The network access device functions or operates in accordance with its software, firmware, and hardware configurations. Messages from the network access device are checked against expected results, stored as outputs of the test code, and sent to the developer for review, for example.

In implementations, a virtual environmental library exposes a virtual environment that a network access device would interact in as a framework that tests can be written against. For example, a network access device receives configuration information from a service provider system and network (SP) and transmits telemetry data back to the SP. The network access device also orchestrates traffic between LAN clients and routes traffic between a LAN client and the WAN. These environmental interactions can be emulated through a software library such as the virtual environmental library, and then exposed through tests. These tests validate the behavior of the device code without requiring a full test suite with manual labor and hardware. In implementations, a developer can define a virtual environment and connect the network access device and associated applications into the virtual environment. A developer may programmatically describe the clients on a network and the way the clients interact with the network. Once the development code is committed and loaded onto the network access device, the test code is run using the virtual environmental library to generate the virtual environment, and the developer will get a report on the behavior of the device code and the network access device within the developer described or defined environment.

Figure 1:
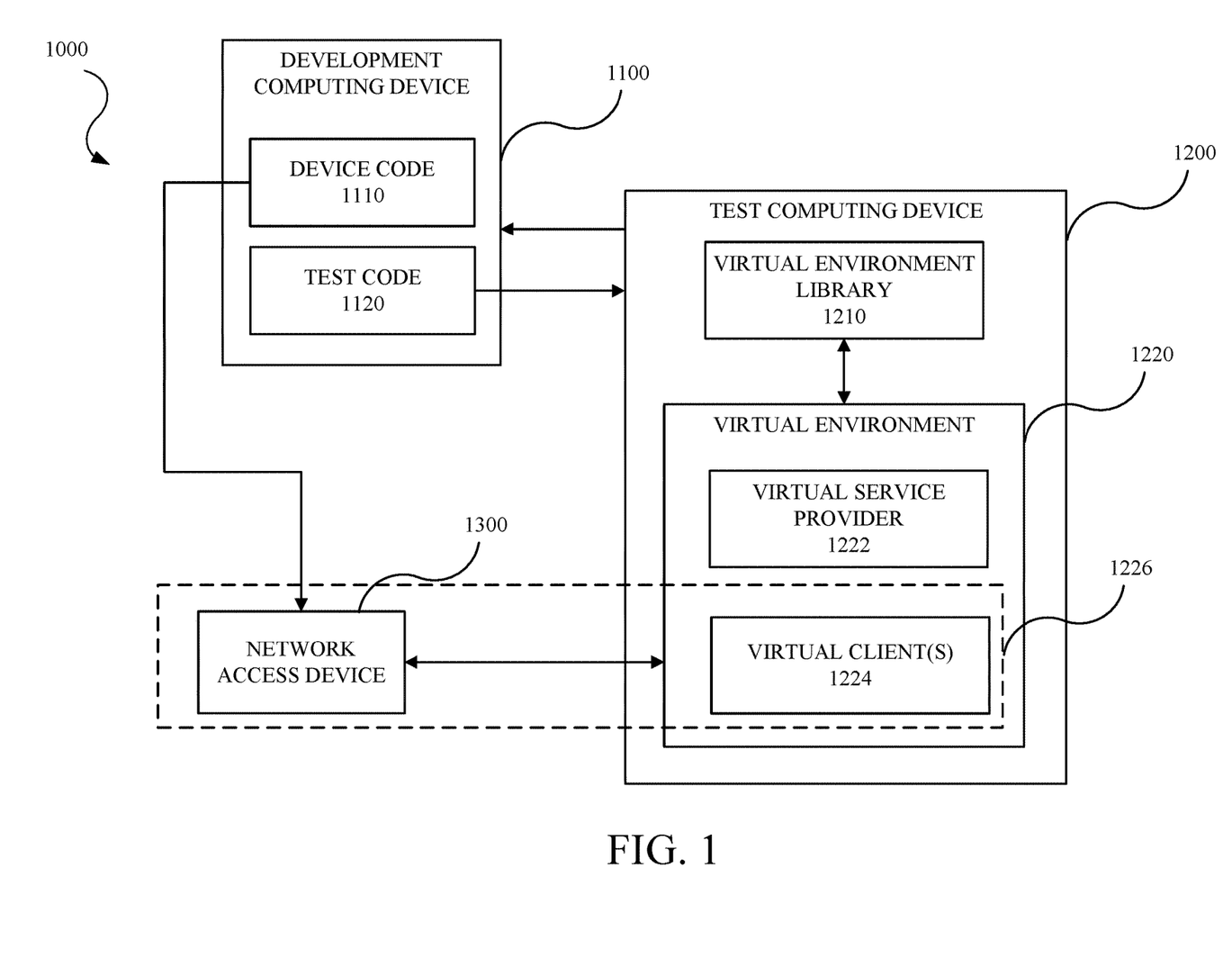
FIG. 1 is a diagram of an example architecture of a system in accordance with embodiments of this disclosure.

FIG. 1 is a diagram of an example architecture 1000 for continuous integration testing of network access devices in accordance with embodiments of this disclosure. In implementations, the architecture 1000 can include a development computing device 1100 connected to or in communication with (collectively "connected to") a test computing device 1200, and a network access device 1300, which can also be connected to the test computing device 1200. The connections between the development computing device 1100, the test computing device 1200, and the network access device 1300 may be wired, wireless, or a combination thereof. In implementations, the development computing device 1100 and the test computing device 1200 can be a computing device which uses containers or techniques to create runtime environments for the test code or the device code as described herein. In an implementation, the architecture 1000 may execute the techniques described in FIGS. 4 and 5. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The development computing device 1100 can be, but is not limited to, end user devices, computing devices, mobile computers, laptops, handheld computers, notebooks, notepads, phablets, servers, cloud-based computing services, and the like. A developer operating on or with the development computing device 1100 can generate a device code 1110 and a test code 1120 to exercise the device code 1110 once the device code 1110 is committed and loaded on the network access device 1300. The test code 1120 can be committed and loaded onto the test computing device 1200 once the device code 1110 is committed and loaded onto the network access device 1300. In implementations, the test code 1120 is automatically loaded onto the test computing device 1200 once the device code 1110 is loaded on the network access device 1300. The test code 1120 is a script written by the developer which uses a virtual environment library 1210 to write tests that the device code 1110 should pass.

The test computing device 1200 can be, but is not limited to, computing devices, mobile computers, laptops, handheld computers, notebooks, notepads, phablets, servers, cloud-based computing services, and the like. The test computing device 1200 includes the virtual environment library 1210 which exposes an application programming interface (API) for the developer to write tests and contains logic to set up a virtual environment 1220 in accordance with the test code 1120 running on the test computing device 1200. The test code 1120 defines and sets the virtual environment 1220 including a virtual service provider 1222, virtual client(s) or virtual client device(s) (collectively "virtual client(s)") 1224, and a virtual LAN 1226 which includes at least the virtual client(s) 1224, and the network interaction or message behavior from the virtual service provider 1222, the virtual client(s) 1224, and the virtual LAN 1226 to the network access device 1300. The network access device 1300 is treated as a client or client device of the virtual LAN 1226.

The virtual service provider 1222 is, for example, an object built by the virtual environment library 1210 and allows for configuration of the network access device 1300 and capturing of event emissions or telemetry data. The virtual service provider 1222 can emulate the service provider system and network. The virtual service provider 1222 can set configuration values within the network access device 1300 and consume telemetry data and statistics which are emitted from the network access device 1300. For example, the telemetry data and statistics can be sent via messages using TR-069, OVSDB, MQTT, and the like. The virtual service provider 1222 can expose the ability to set configuration options in the network access device 1300. These are configurations that the device code 1110 being written or other device code utilize to change the network access device 1300 behavior. A few examples of this in test code are shown below in Table I, where the term "cloud" refers to the virtual service provider 1222. In this example, the virtual service provider 1222 sets the ssid to "My Test SSID", sets the passphrase to "TestPassPhrase", and sets the parental controls to "AA:BB:CC:DD:EE:FF".

TABLE I

| | VIRTUAL CONFIGURATION SETTING |
|---|---|
| 1 | const env = require('virtual-router-env') |
| 2 | const cloud = env.cloud({domain: localhost'}); |
| 3 | |
| 4 | cloud.set('ssid', 'My Test SSID') |
| 5 | cloud.set('passphrase', 'TestPassPhrase') |
| 6 | |
| 7 | cloud.set('parental controls', 'AA:BB:CC:DD:EE:FF') |

As stated above, the virtual service provider 1222 also exposes the ability to wait for certain events and assert what their outcomes should be. A few examples of this in test code are shown below in Table II. In a first example, the test code defines that the expected events should include a threat recognition and a block action when an attempt is made to go to the defined site. In a second example, the test code defines that the expected events should include recognition of a ssid configuration change by updating the ssid to "My Test SSID" and acknowledging the same. In a third example, the test code defines that the expected events should include recognition of a passphrase configuration change by updating the passphrase to "TestPassPhrase" and acknowledging the same.

TABLE II

| | EVENT STREAM TESTS |
|---|---|
| 1 | const env = require('virtual-router-env'); |
| 2 | const cloud = env.cloud({domain: Jocalhose}); |
| 3 | |
| 4 | cloud.events( (event) => { |
| 5 |   expect(event) |
| 6 |   .should.be.an('object') |
| 7 |   .that.deep.equals({ |
| 8 |     'event': 'threat' |
| 9 |     'action': 'block' |
| 10 |     'url': 'http://some.botnet.website.com' |
| 11 |   }); |
| 12 | }); |
| 13 | |
| 14 | cloud.events( (event) => { |
| 15 |   expect(event) |
| 16 |   .should.be.an('object') |
| 17 |   .that.deep.equals({ |
| 18 |     'event': 'config-change' |
| 19 |     'action': 'ssid' |
| 20 |     'update': 'My Test SSID' |
| 21 |   }); |
| 22 | }); |
| 23 | |
| 24 | cloud.events( (event) => { |
| 25 |   expect(event) |
| 26 |   .should.be.an('object') |
| 27 |   .that.deep.equals({ |
| 28 |     'event': 'config-change' |
| 29 |     'action': 'passphrase' |
| 30 |     'update': 'TestPassPhrase' |
| 31 |   }); |
| 32 | }); |

The virtual client(s) 1224 is, for example, an object built by the virtual environment library 1210 and allows for association with the network access device 1300 and exposes an API set for network interactions. The virtual client(s) 1224 allows for emulating client traffic within a user's network, e.g., the virtual LAN 1226. The virtual LAN 1226 includes the virtual client(s) 1224 and the associated message traffic which can be configured to behave in prescriptive methods that the device code logic should be able to respond to, and the network access device 1300 as one of the virtual LAN 1226 clients.

The virtual client(s) 1224 API allows selection of a credential type including, but not limited to, security credentials, WPA2 credentials, Ethernet credentials, pre-shared key (PSK) credentials, passphrase credentials, and the like, specification of media access control (MAC) credentials, Dynamic Host Configuration Protocol (DHCP) request options, ability to resolve or curl URLs, ability to send raw Transmission Control Protocol (TCP) or User Datagram Protocol (UDP) packets, port specifications for all requests, ability to interact at L2 layer with other virtual clients, and the like. A few examples of this in test code are shown below in Table III. In a first example, the test code sets the network access device credentials for a first virtual client ("client1"). In a second example, the test code sets the network access device credentials for a second virtual client ("client2"). In a third example, the test code sets the DHCP credentials for the first virtual client. In a fourth example, the test code sets the DHCP credentials for the second virtual client. In a fifth example, the test code sets credentials for interaction between the first virtual client and the second virtual client.

TABLE III

| | VIRTUAL CLIENT API |
|---|---|
| 1 | const env = require('virtual-router-env') |
| 2 | |
| 3 | const client1 = env.client.create({ |
| 4 |   mac: 'AA:BB:CC:DD:EE:FF', |
| 5 |   credential: { |
| 6 |     type: 'WPA2', |
| 7 |     ssid: 'My Test SSID', |
| 8 |     passphrase: 'TestPassPhrase' |
| 9 |   } |
| 10 | }); |
| 11 | |
| 12 | const client2 = env.client.create({ |
| 13 |   mac: 'BB:BB:BB:DD:EE:FF', |
| 14 |   credential: { |
| 15 |     type: 'eth' |
| 16 |   } |
| 17 | }); |
| 18 | |
| 19 | // DHCP request with default options |
| 20 | const dhcp1 = client1.dhcp( ) |
| 21 | |
| 22 | // DHCP request with custom options |
| 23 | const dhcp2 = client2.dhcp({ |
| 24 |   "DhcpOptions": { |
| 25 |     "DhcpConfigurations": [ |
| 26 |       { |
| 27 |         "Key": "domain-name", |
| 28 |         "Values": [ |
| 29 |           { |
| 30 |             "Value": "example.com" |
| 31 |           } |
| 32 |         ] |
| 33 |       }, |
| 34 |       { |
| 35 |         "Key": "domain-name-servers", |
| 36 |         "Values": [ |

TABLE III-continued

VIRTUAL CLIENT API

```
37            {
38               "Value": "10.2.5.1"
39            },
40            {
41               "Value": "10.2.5.2"
42            }
43         ]
44       },
45       {
46          "Key": "netbios-node-type",
47          "Values": [
48            {
49               "Value": "2"
50            }
51         ]
52       }
53       ],
54       "DhcpOptionsId": "dopt-06d52773eff4c55f3"
55    }
56 })
57
58 const response = await client1.resolve('http://some.botnet.website.com')
59 const response = await client2.resolve('http://some.botnet.website.com')
60
61 const result = client1.traffic({
62    type: 'UDP',
63    data: 'someteststring',
64    port: 3480,
65       dest: '1.2.3.4'
66 });
67
68 client2.listen((data) => {
69    expect(data)
70    .matches('my test lan string')
71 }, {port: 3480, type: 'UDP'});
72
73 const result = client1.traffic({
74    type: 'UDP',
75    data: 'my test lan string',
76    port: 3480,
77       dest: client2
78 });
```

The network access device 1300 can be, but is not limited to, an access point, a router, a modem, a cable modem, a set top box, an Internet Service Provider (ISP) system device, a service provider (SP) access device, an access point device, network devices, gateways, and the like which provides access to a network of the virtual service provider 1222.

Operationally, once the device code 1110 is loaded onto the network access device 1300 from the development computing device 1100, the test code 1120 is loaded onto the test computing device 1200. The test code 1120 executes on the test computing device 1200 using the virtual environment library 1210 to generate the virtual environment 1220 in accordance with the test code 1120. Test scenarios in the test code 1120 which exercise the device code 1110 are executed and event or telemetry data is captured and compared against expected events as written in the test code 1120. Results or output from the executed test code 1120 are sent to the developer, for example, at the development computing device 1100.

Figure 2:
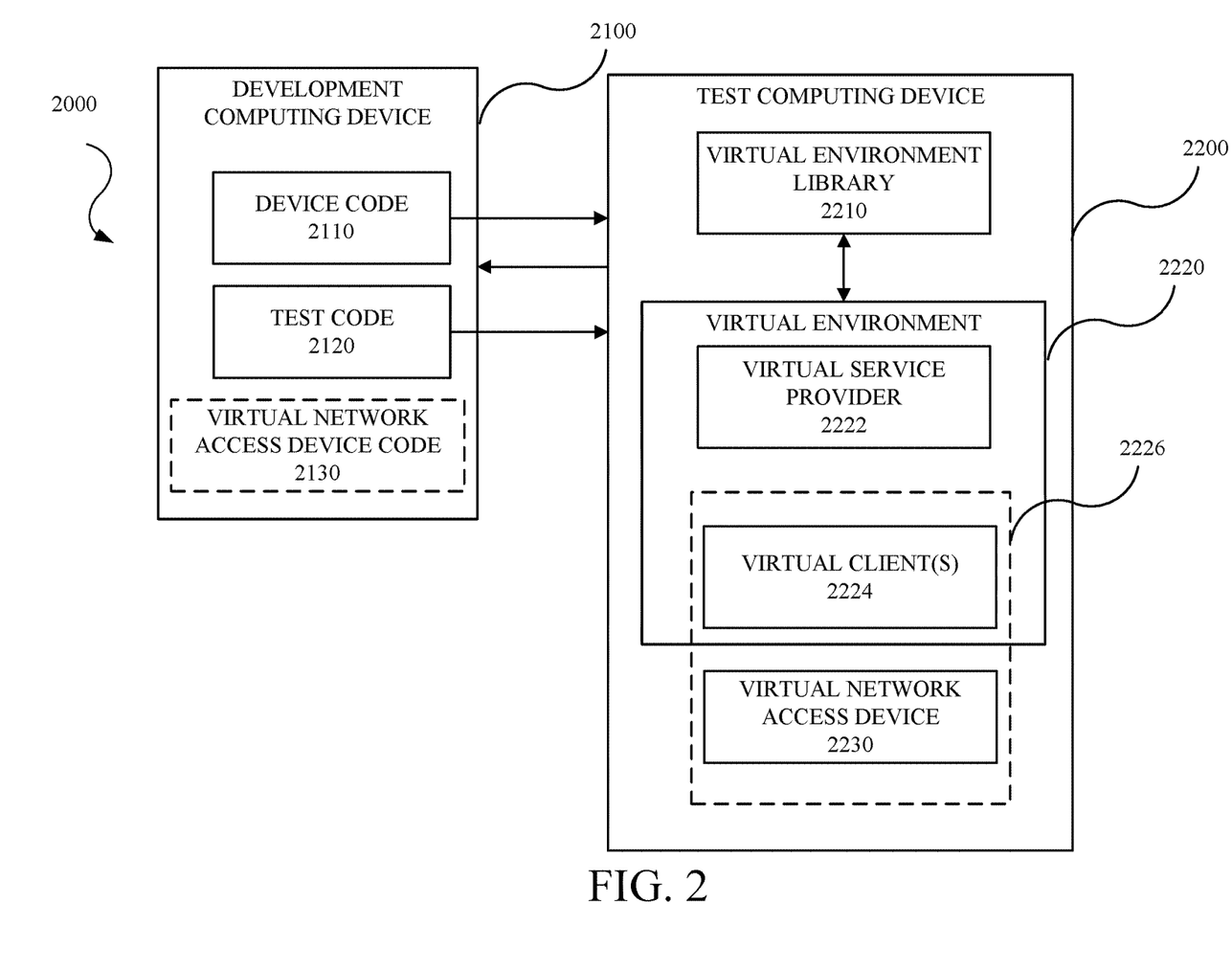
FIG. 2 is a diagram of an example architecture of a system in accordance with embodiments of this disclosure.

FIG. 2 is a diagram of an example architecture 2000 for continuous integration testing of network access devices in accordance with embodiments of this disclosure. In implementations, the architecture 2000 can include a development computing device 2100 connected to or in communication with (collectively "connected to") a test computing device 2200. The connections between the development computing device 2100 and the test computing device 2200 may be wired, wireless, or a combination thereof. In implementations, the development computing device 2100 and the test computing device 2200 can be a computing device which uses containers or techniques to create runtime environments for the test code or the device code as described herein. In an implementation, the architecture 2000 may execute the techniques described in FIGS. 4 and 5. The architecture 2000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The development computing device 2100 can be, but is not limited to, end user devices, computing devices, mobile computers, laptops, handheld computers, notebooks, notepads, phablets, servers, cloud-based computing services, and the like. A developer operating on or with the development computing device 2100 can generate a device code 2110 and a test code 2120 to exercise the device code 2110 once the device code 2110 is committed and loaded on a virtual network access device 2300. The test code 2120 can be committed and loaded onto the test computing device 2200 once the device code 2110 is committed and loaded onto the virtual network access device 2300. In implementations, the test code 2120 is automatically loaded onto the test computing device 2200 once the device code 2110 is loaded on the virtual network access device 2300. The test code 2120 is a script written by the developer which uses a virtual environment library 2210 to write tests that the device code 2110 should pass.

The test computing device 2200 can be, but is not limited to, computing devices, mobile computers, laptops, handheld computers, notebooks, notepads, phablets, servers, cloud-based computing services, and the like. The test computing device 2200 includes the virtual environment library 2210 which exposes an application programming interface (API) for the developer to write tests and contains logic to set up a virtual environment 2220 in accordance with the test code 2120 running on the test computing device 2200. The test code 2120 defines and sets the virtual environment 2220 including a virtual service provider 2222, virtual client(s) 2224, and a virtual LAN 2226 which includes at least the virtual client(s) 2224, and the network interaction or message behavior from the virtual service provider 2222, the virtual client(s) 2224, and the virtual LAN 2226 to the virtual network access device 2300. The virtual network access device 2300 is treated as a client or client device of the virtual LAN 2226.

The virtual service provider 2222 is, for example, an object built by the virtual environment library 2210 and allows for configuration of the virtual network access device 2300 and capturing of event emissions or telemetry data. The virtual service provider 2222 can emulate the service provider system and network. The virtual service provider 2222 can set configuration values within the virtual network access device 2300 and consume telemetry data and statistics which are emitted from the virtual network access device 2300. For example, the telemetry data and statistics can be sent via messages using TR-069, OVSDB, MQTT, and the like. The virtual service provider 2222 can expose the ability to set configuration options in the virtual network access device 2300. These are configurations that the device code 2110 being written or other device code utilize to change the virtual network access device 2300 behavior. A few examples of this in test code are shown in Table I as described herein.

As stated above, the virtual service provider 2222 also exposes the ability to wait for certain events and assert what their outcomes should be. A few examples of this in test code are shown in Table II as described herein.

The virtual network access device 2300 is, for example, an object built by the virtual environment library 2210 and allows for association with the virtual environment 2220 and exposes an API set for network interactions. In implementations, the virtual network access device 2300 can generated in accordance with virtual network access device code 2130, which can be on the development computing device 2100, the test computing device 2200, another computing device, and the like, and can be loaded executed on the test computing device 2200. In implementations, the virtual network access device 2300 can be generated on another computing device which is connected to the test computing device 2200. The device code 2110 can be loaded onto the virtual network access device 2300 via the virtual service provider 2222 or the virtual network access device 2300 can be generated with the device code 2110. The virtual network access device 2300 can be, but is not limited to, an access point, a router, a modem, a cable modem, a set top box, an Internet Service Provider (ISP) system device, a service provider (SP) access device, an access point device, network devices, gateways, and the like which provides access to a network of the virtual service provider 2222.

The virtual client(s) 2224 is, for example, an object built by the virtual environment library 2210 and allows for association with the virtual network access device 2300 and exposes an API set for network interactions. The virtual client(s) 2224 allows for emulating client traffic within a user's network, e.g., the virtual LAN 2226. The virtual LAN 2226 includes the virtual client(s) 2224 and the associated message traffic which can be configured to behave in prescriptive methods that the device code logic should be able to respond to, and the virtual network access device 2300 as one of the virtual LAN 2226 clients.

The virtual client(s) 2224 API allows selection of a credential type including, but not limited to, security credentials, WPA2 credentials, Ethernet credentials, pre-shared key (PSK) credentials, passphrase credentials, and the like, specification of media access control (MAC) credentials, Dynamic Host Configuration Protocol (DHCP) request options, ability to resolve or curl URLs, ability to send raw Transmission Control Protocol (TCP) or User Datagram Protocol (UDP) packets, port specifications for all requests, ability to interact at L2 layer with other virtual clients, and the like. A few examples of this in test code are shown in Table III as described herein.

Operationally, once the device code 2110 is loaded onto the virtual network access device 2300 from the development computing device 2100 or the virtual network access device 2300 is generated with the device code 2110, the test code 2120 is loaded onto the test computing device 2200. The test code 2120 executes on the test computing device 2200 using the virtual environment library 2210 to generate the virtual environment 2220 in accordance with the test code 2120. Test scenarios in the test code 2120 which exercise the device code 2110 are executed and event or telemetry data is captured and compared against expected events as written in the test code 2120. Results or output from the executed test code 2120 are sent to the developer, for example, at the development computing device 2100.

Figure 3:
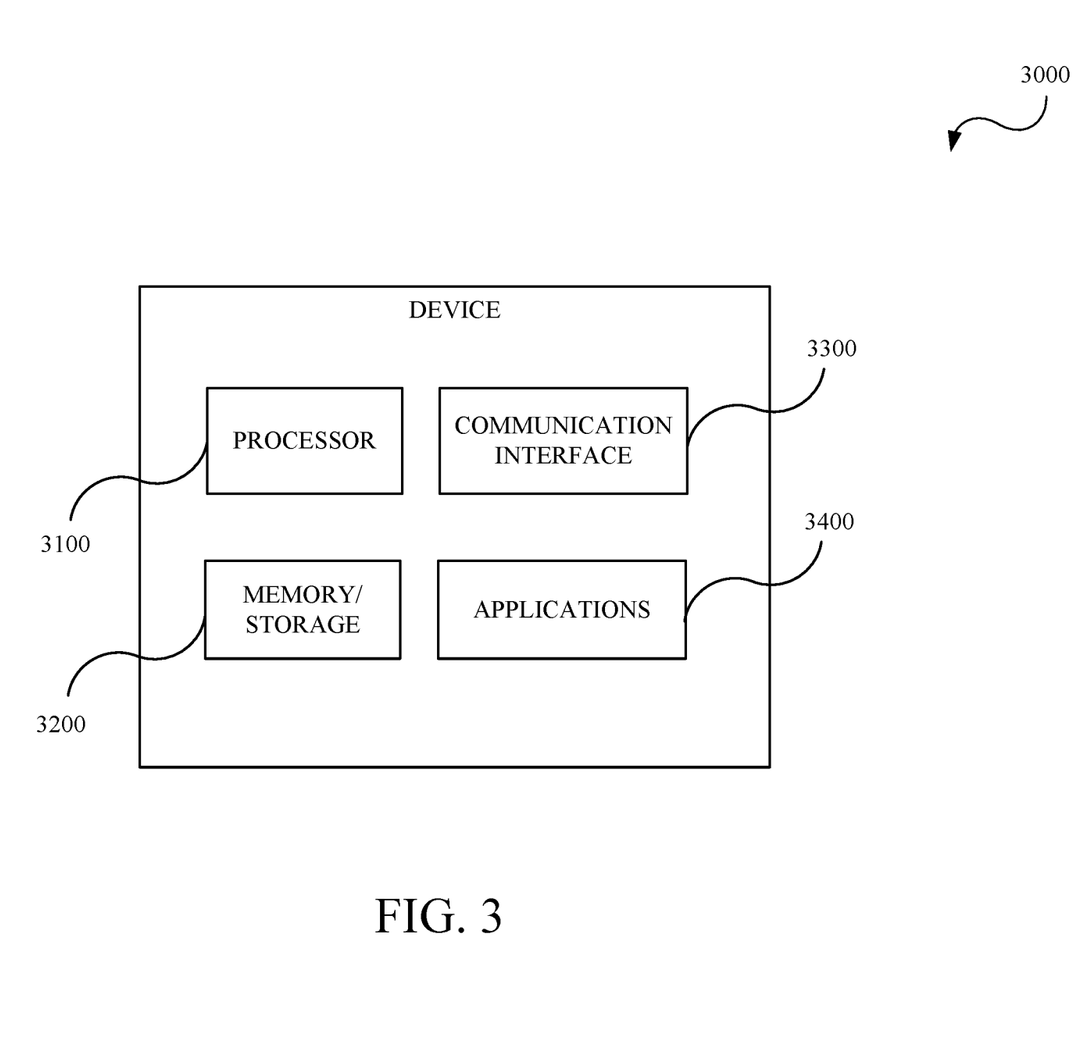
FIG. 3 is a block diagram of an example of a device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. The device 3000 may include or implement, for example, the development computing device 1100, the test computing device 1200, the network access device 1300, the development computing device 2100, and the test computing device 2200. In an implementation, the memory/storage 4200 may store the device code, test code, virtual network access device code, results, outputs, objects, message traffic, and like information. The continuous integration testing of network access devices techniques or methods described herein may be stored in the memory/storage 3200 and executed by the processor 3100 in cooperation with the memory/storage 3200, the communications interface 3300, and applications 3400, as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
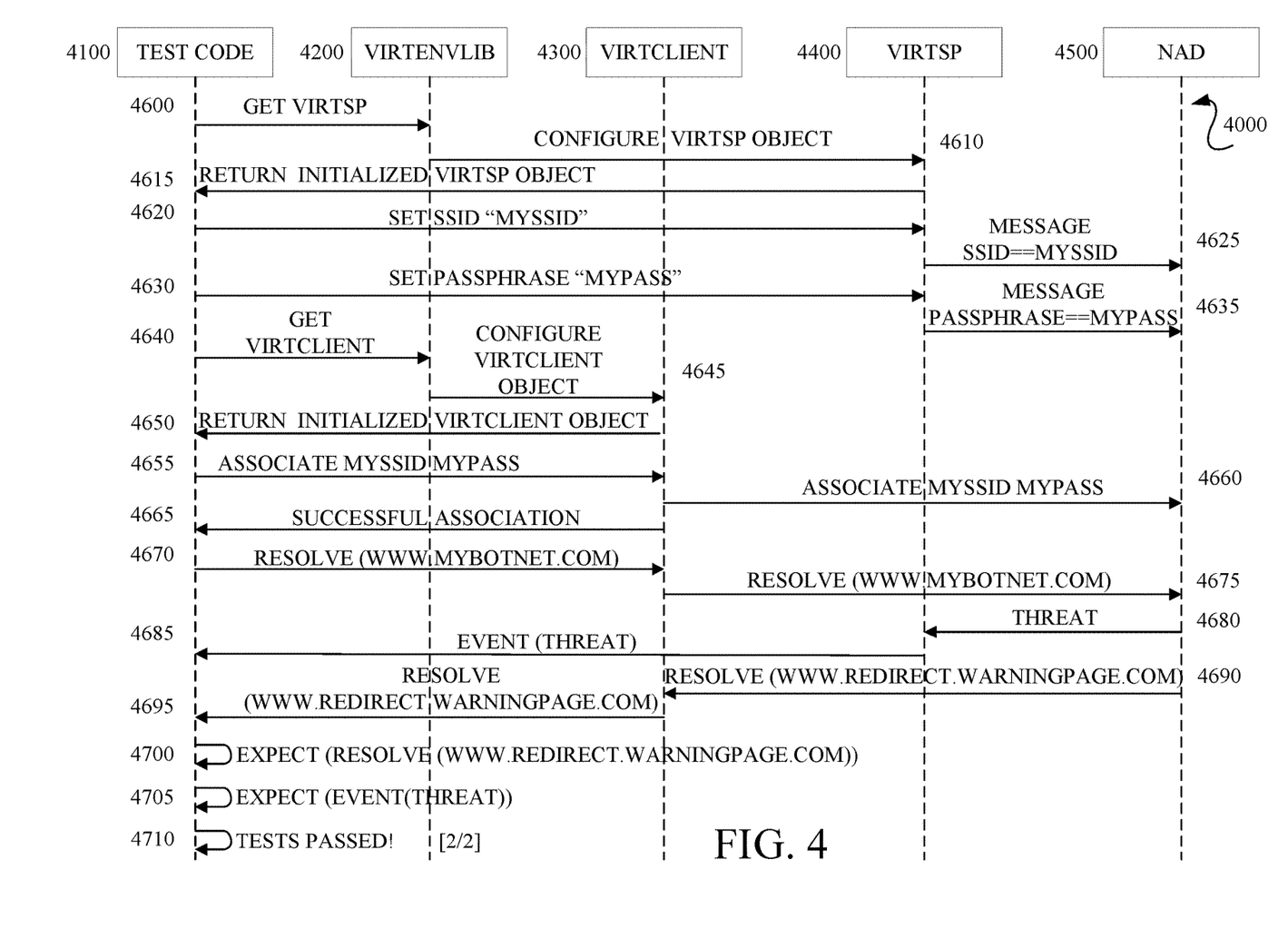
FIG. 4 is a sequence flow diagram of an example automated continuous integration testing in accordance with embodiments of this disclosure.

FIG. 4 is a sequence flow diagram of an example flow 4000 of continuous integration testing of network access devices in accordance with embodiments of this disclosure. The flow 4000 describes interactions between a test code 4100, a virtual environmental library 4200, a virtual client(s) 4300, a virtual service provider 4400, and a network access device 4500. Execution or running of the test code 4100 starts with calling the virtual environmental library 4200 to get the virtual service provider 4400 (4600). The virtual environmental library 4200 configures an object for the virtual service provider 4400 (4610). The virtual service provider 4400 returns initialization data to the test code 4100 (4615). The test code 4100 sends a command to the virtual service provider 4400 to set the ssid to "myssid" at the network access device 4500 (4620). The virtual service provider 4400 sends a configuration message to the network access device 4500 to set the ssid to "myssid" (4625). The test code 4100 sends a command to the virtual service provider 4400 to set the passphrase to "mypass" at the network access device 4500 (4630). The virtual service provider 4400 sends a configuration message to the network access device 4500 to set the passphrase to "mypass" (4635). The test code 4100 calls the virtual environmental library 4200 to get the virtual client 4300 (4640). The virtual environmental library 4200 configures an object for the virtual client 4300 (4645). The virtual client 4300 returns initialization data to the test code 4100 (4650).

The test code 4100 instructs the virtual client 4300 to access the network access device 4500 using myssid and mypass so that the virtual client 4300 can access the network access device 4500 (4655). The virtual client 4300 associates or connects with the network access device 4500 using the myssid and mypass (4660). The virtual client 4300 returns a successful association event to the test code 4100 (4665). The test code instructs the virtual client 4300 to resolve to www.mybotnet.com (4670). The virtual client 4300 attempts to resolve to www.mybotnet.com via the network access device 4500 (4675). The network access device 4500 determines that www.mybotnet.com is a threat and sends a message to the virtual service provider 4400 (4680). The virtual service provider 4400 returns the threat determination event to the test code 4100 (4685). The network access device 4500 provides a redirect page to the virtual client 4300 instead of resolving to www.mybotnet.com (4690). The virtual client 4300 returns the redirect page event to the test code 4100 (4695).

The test code 4100 evaluates the redirect page event against expected events (4700). The test code 4100 evaluates the threat determination event against expected events (4705). The test code 4100 outputs a positive result if all returned events match all expected events (4710).

Figure 5:
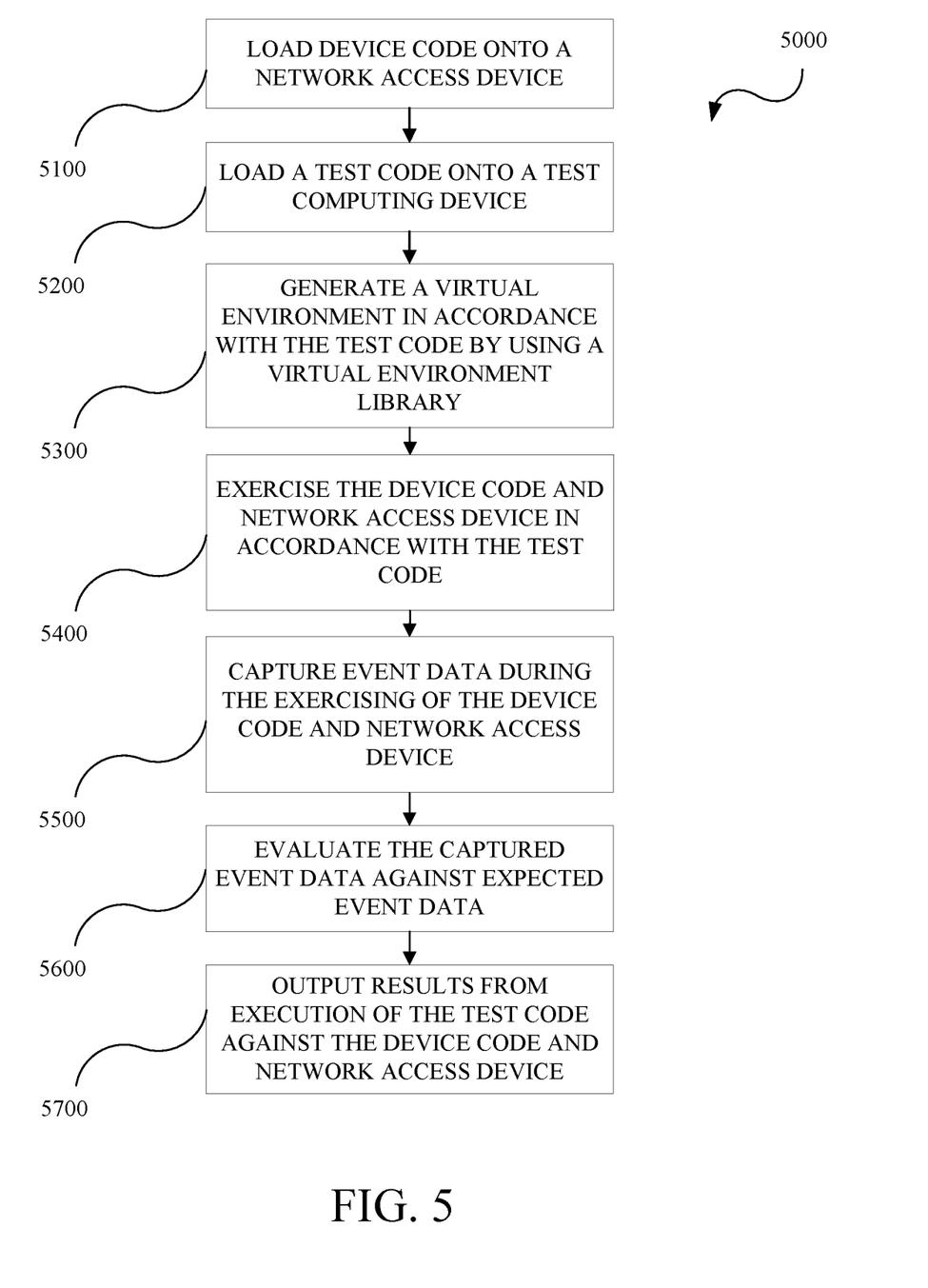
FIG. 5 is a flowchart of an example method for automated continuous integration testing in accordance with embodiments of this disclosure.

FIG. 5 is a flowchart of an example method 5000 for continuous integration testing of network access devices in accordance with embodiments of this disclosure. The method 5000 includes: loading 5100 device code onto a network access device; loading 5200 a test code onto a test computing device; generating 5300 a virtual environment in accordance with the test code by using a virtual environment library; exercising 5400 the device code and network access device in accordance with the test code; capturing 5500 event data during the exercising of the device code and network access device; evaluating 5600 the captured event data against expected event data; and outputting 5700 results from execution of the test code against the device code and network access device. For example, the method 5000 may be implemented, as applicable and appropriate, by the development computing device 1100 of FIG. 1, the test computing device 1200 of FIG. 1, the network access device 1300 of FIG. 1, the virtual environment library 1210 of FIG. 1, the test code 1120 of FIG. 1, the device code 1110 of FIG. 1, the development computing device 2100 of FIG. 2, the test computing device 2200 of FIG. 2, the virtual environment library 2210 of FIG. 2, the test code 2120 of FIG. 2, the device code 2110 of FIG. 2, the virtual network access device code 2130 of FIG. 2, the device 3000 of FIG. 3, the processor 3100 of FIG. 3, the memory/storage 3200 of FIG. 3, and the communication interface 3300 of FIG. 3.

The method 5000 includes loading 5100 device code onto a network access device. A developer has written and committed device code which is loaded onto a network access device.

The method 5000 includes loading 5200 a test code onto a test computing device. The developer has also written test code for testing or exercising the device code and the network access device. The test code includes code to configure a virtual environment for testing the device code and the network access device. In implementations, the test code is automatically loaded onto a test computing device when the device code is loaded onto the network access device.

The method 5000 includes generating 5300 a virtual environment in accordance with the test code by using a virtual environment library. The test code is executed on the test computing device and invokes the virtual environment library to generate a virtual environment including virtual clients and a virtual service provider, along with emulating system or device connections on a wide area network (WAN), sending environmental scene or test traffic over any of the communication interfaces of a network access device including local area network (LAN) interfaces, the WAN interface, or an Ethernet interface. The test code sets the configuration of the virtual environment, sets the configuration of the network access device, and sets the behavior of the virtual client(s) and the virtual service provider in the virtual environment in a prescriptive manner. The test code in coordination with the virtual environment library emulates network behavior in the virtual environment.

The method 5000 includes exercising 5400 the device code and network access device in accordance with the test code. The test code configures and instructs the virtual clients and the virtual service provider to prompt or stimulate the network access device, by sending commands and the like, to perform certain actions, including, but not limited to, setting configurations, resolving to certain websites, connecting to certain devices, and the like, to test the response of the network access device and the device code.

The method 5000 includes capturing 5500 event data during the exercising of the device code and network access device. The network access device generates telemetry data, event data, or response messages in response to the commands from the virtual clients and the virtual service provider which are captured by the virtual clients and the virtual service provider and forwarded to the test code.

The method 5000 includes evaluating 5600 the captured event data against expected event data. The test code determines whether each captured event matches an expected event.

The method 5000 includes outputting 5700 results from execution of the test code against the device code and network access device. The test code outputs the captured events, expected events, pass/fail determination, and like data to the developer.

In general, a testing platform includes a virtual environmental library and a processor. The processor configured to execute a test code, where the test code in cooperation with the virtual environmental library is configured to generate a virtual environment for testing a network access device loaded with a device code, wherein the virtual environment includes virtual clients, a virtual service provider, and emulates communication interfaces and network message behavior for the virtual clients and the virtual service provider as perceived by the network access device, exercise the device code and the network access device by instructing the virtual clients and the virtual service provider to engage the network access device to perform defined activities to test the device code, capture events from the network access device in response to performance of the defined activities, evaluate the captured events against expected events defined in the test code, and output results from the testing of the device code and the network access device including at least the captured events and a pass and fail determination. In implementations, the test code in cooperation with the virtual environmental library is configured to set configuration data for the virtual clients. In implementations, the configuration data includes security credentials, interface credentials, pre-shared key credentials, passphrase credentials, media access control credentials, Dynamic Host Configuration Protocol (DHCP) request options, ability to resolve or curl Internet addresses, ability to send defined protocol packet data, port specifications, and an ability to interact at a L2 layer between the virtual clients. In implementations, the test code in cooperation with the virtual environmental library is configured to set configuration data for the network access device via the virtual service provider. In implementations, the configuration data for the network access device includes at least service set identifiers and passphrases. In implementations, the network access device is a physical device. In implementations, the network access device is a virtual device. In implementations, the test code in cooperation with the virtual environmental library is configured to load the device code into the virtual device via the virtual service provider. In implementations, the test code in cooperation with a defined library is configured to generate the virtual device with the device code. In implementations, the virtual clients are configured to capture the events from the network access device in response to virtual client messages. In implementations, the virtual service provider is configured to capture the events from the network access device in response to virtual service provider messages.

In general, a method for testing a router, the method includes launching a virtual background by a library according to a test code for testing an application loaded on a router, the virtual background including virtual client devices, a virtual network system, and message emulation for sending and receiving communications from the router, sending, according to the test code, messages from the virtual client devices to the router to perform test actions which exercise functionality of the application and the router, capturing responsive actions from the router in response to the test actions, assessing the responsive actions against coded responsive actions, and sending assessment results of the application and the router. In implementations, the method further including sending, according to the test code, messages from the virtual network system to the router to configure the router. In implementations, the test code in cooperation with the library is configured to set configuration data for the virtual client devices. In implementations, the router is a virtual router and further includes loading the virtual router with the application via the virtual network system.

In general, a method for testing an access point, the method including loading device software on an access point, executing testing software for testing the device software and the access point, calling a virtual environmental library during execution of the testing software to generate virtual clients, a virtual network, and interface emulation for message traffic to the access point and from the access point, sending, according to the executing testing software, test messages from the virtual clients to the access point to exercise device software functionality on the access point, capturing responsive messages from the access point in response to the test messages, evaluating the responsive messages against expected responsive messages, and sending evaluation results of the testing software and the access point. In implementations, the method further including sending, according to the executing test code, configuration messages from the virtual network to configure the access point. In implementations, generation of the virtual clients includes setting configuration profiles for the virtual clients in accordance with the testing software. In implementations, the access point is a virtual access point and further including loading the virtual access point with the device software via the virtual network. In implementations, the test messages include setting service set identifiers, setting passphrases, going to a blocked site, and connecting to more than a defined number of virtual clients.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A testing platform comprising:
a virtual environmental library; and
a processor, the processor configured to execute an automated test code automatically loaded onto the testing platform upon loading undeployed device code on a network access device, wherein the test code in cooperation with the virtual environmental library is configured to:
generate a virtual environment for testing the network access device loaded with the device code, wherein the virtual environment includes virtual clients, a virtual service provider, a virtual network, and emulates communication interfaces and network message behavior for the virtual clients and the virtual service provider as perceived by the network access device;
exercise the device code and the network access device by instructing the virtual clients and the virtual service provider to engage the network access device to perform defined activities to test the device code;
capture events from the network access device in response to performance of the defined activities;
send response messages to the network access device based on the behavior of the network access device;
evaluate the captured events against expected events as written and defined in the test code; and
output results from the testing of the device code and the network access device including at least the captured events and a pass and fail determination based on comparison of the captured events against expected events,
wherein the device code, the network access device, and combination of the device code and the network access device are tested.

2. The testing platform of claim 1, wherein the test code in cooperation with the virtual environmental library is configured to set configuration data for the virtual clients.

3. The testing platform of claim 2, wherein the configuration data includes security credentials, interface credentials, pre-shared key credentials, passphrase credentials, media access control credentials, Dynamic Host Configuration Protocol (DHCP) request options, ability to resolve or curl Internet addresses, ability to send defined protocol packet data, port specifications, and an ability to interact at a L2 layer between the virtual clients.

4. The testing platform of claim 2, wherein the test code in cooperation with the virtual environmental library is configured to set configuration data for the network access device via the virtual service provider.

5. The testing platform of claim 4, wherein the configuration data for the network access device includes at least service set identifiers and passphrases.

6. The testing platform of claim 5, wherein the network access device is a physical device.

7. The testing platform of claim 5, wherein the network access device is a virtual device.

8. The testing platform of claim 7, wherein the test code in cooperation with the virtual environmental library is configured to load the device code into the virtual device via the virtual service provider.

9. The testing platform of claim 7, wherein the test code in cooperation with a defined library is configured to generate the virtual device with the device code.

10. The testing platform of claim 1, wherein the virtual clients are configured to capture the events from the network access device in response to virtual client messages.

11. The testing platform of claim 10, wherein the virtual service provider is configured to capture the events from the network access device in response to virtual service provider messages.

12. A method for testing a router, the method comprising:
launching a virtual background by a library according to a test code for testing an application loaded on a router, the virtual background including virtual client devices, a virtual network system, and message emulation for sending and receiving communications from the router as between the virtual client devices and virtual network system;
sending, according to the test code, messages from the virtual client devices to the router to perform test actions which exercise functionality of the application and the router;
capturing responsive actions from the router in response to the test actions;
assessing the responsive actions against coded responsive actions;
transmitting, according to the test code, responsive messages from the virtual client devices to the router, the responsive messages responsive to the responsive actions; and
sending assessment results of the application and the router.

13. The method of claim 12, further comprising:
sending, according to the test code, messages from the virtual network system to the router to configure the router.

14. The method of claim 13, wherein the test code in cooperation with the library is configured to set configuration data for the virtual client devices.

15. The method of claim 14, wherein the router is a virtual router and further comprising:
loading the virtual router with the application via the virtual network system.

16. A method for testing an access point, the method comprising:
loading device software on an access point;
automatically executing automated testing software for testing the device software and the access point upon loading completion, wherein the automated testing software:
calls a virtual environmental library during execution of the testing software to generate virtual clients, a virtual network, and interface emulation for message traffic to the access point and from the access point;
sends, according to the executing testing software, test messages from the virtual clients to the access point to exercise device software functionality on the access point;
captures responsive messages from the access point in response to the test messages;
responds to the responsive messages by sending further test messages;
evaluates the responsive messages against expected responsive messages; and
sends evaluation results of the testing software and the access point.

17. The method of claim 16, further comprising:
sending, according to the executing test code, configuration messages from the virtual network to configure the access point.

18. The method of claim 17, wherein generation of the virtual clients includes setting configuration profiles for the virtual clients in accordance with the testing software.

19. The method of claim 18, wherein the access point is a virtual access point and further comprising:
loading the virtual access point with the device software via the virtual network.

20. The method of claim 19, wherein the test messages include setting service set identifiers, setting passphrases, going to a blocked site, and connecting to more than a defined number of virtual clients.

* * * * *